United States Patent [19]

Cummins et al.

[11] Patent Number: 5,784,120
[45] Date of Patent: Jul. 21, 1998

[54] VIDEO DECODER ADAPTED TO COMPENSATE FOR TIME VARIATIONS BETWEEN SUCCESSIVE HORIZONTAL/ VERTICAL SYNCHRONIZATION PULSES

[75] Inventors: Timothy Cummins, Craloe; Brian P. Murray, Dublin, both of Ireland; Christian Böhm, Neutraubling, Germany

[73] Assignee: Analog Devices, Inc., Norwood, Mass.

[21] Appl. No.: 656,056

[22] Filed: May 31, 1996

[51] Int. Cl.⁶ .......................................... H03L 7/00
[52] U.S. Cl. .......................................... 348/537; 348/572
[58] Field of Search .......................... 348/537, 572, 348/536, 497, 521

[56] References Cited

U.S. PATENT DOCUMENTS

| | | |
|---|---|---|
| 5,150,201 | 9/1992 | Mehrgardt et al. .................. 358/23 |
| 5,335,074 | 8/1994 | Stec ..................................... 348/537 |
| 5,367,338 | 11/1994 | Rothermel et al. ................. 348/538 |
| 5,600,379 | 2/1997 | Wagner ............................... 348/537 |

Primary Examiner—Victor R. Kostak
Attorney, Agent, or Firm—Fish & Richardson P.C.

[57] ABSTRACT

A video decoder is provided wherein digitized samples of an input video signal are produced at a fixed sampling rate and, from such digitized samples, a fixed number of re-sampled digitized samples are produced for each detected sync pulse included in the video signal. The re-sampled digitized samples are stored in a buffer memory and are retrieved from such buffer memory at a rate synchronized to the sync pulse. With such an arrangement, the analog to digital converter operates at a fixed sampling rate, and overflow situations are avoided.

8 Claims, 7 Drawing Sheets

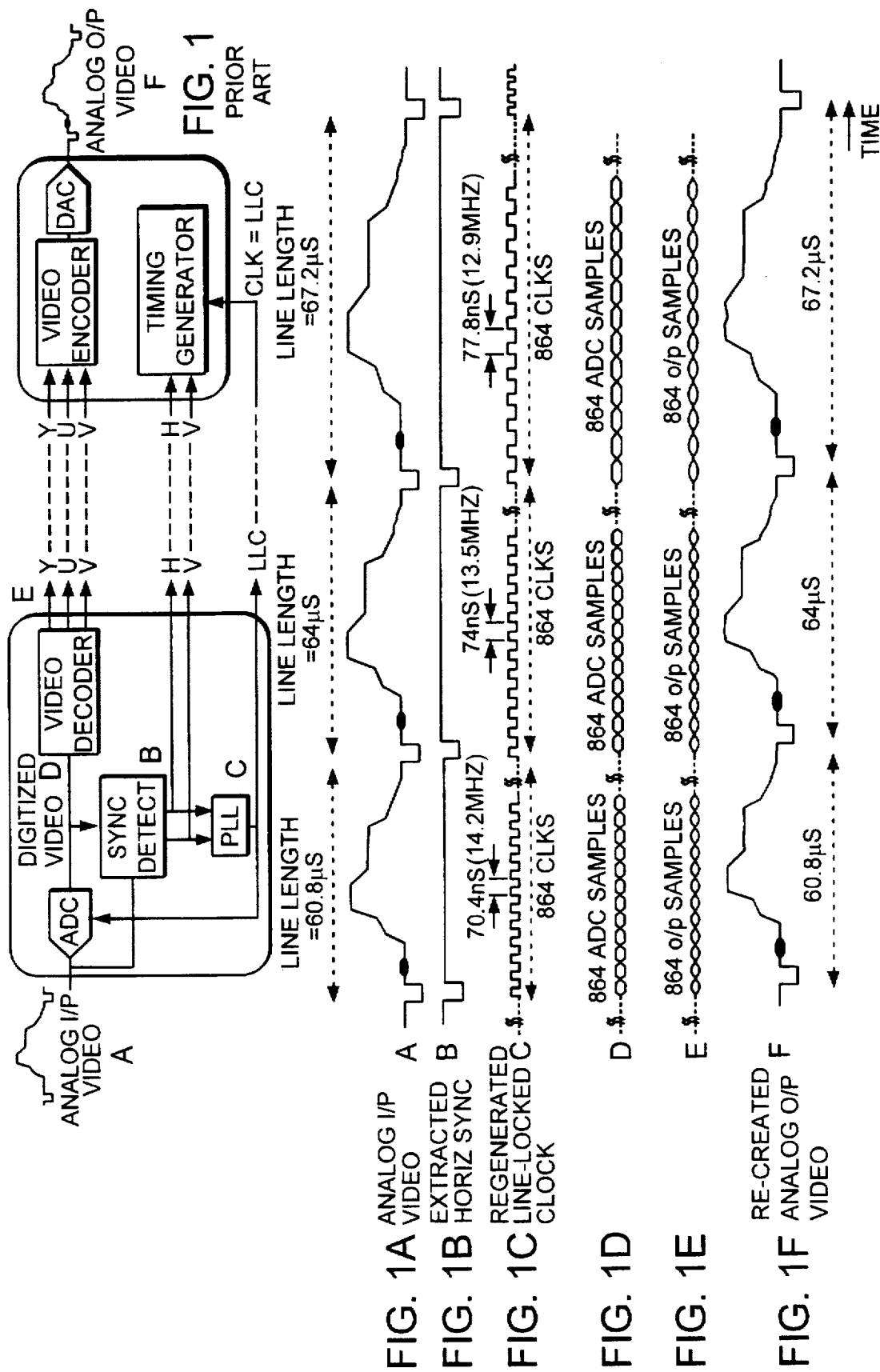

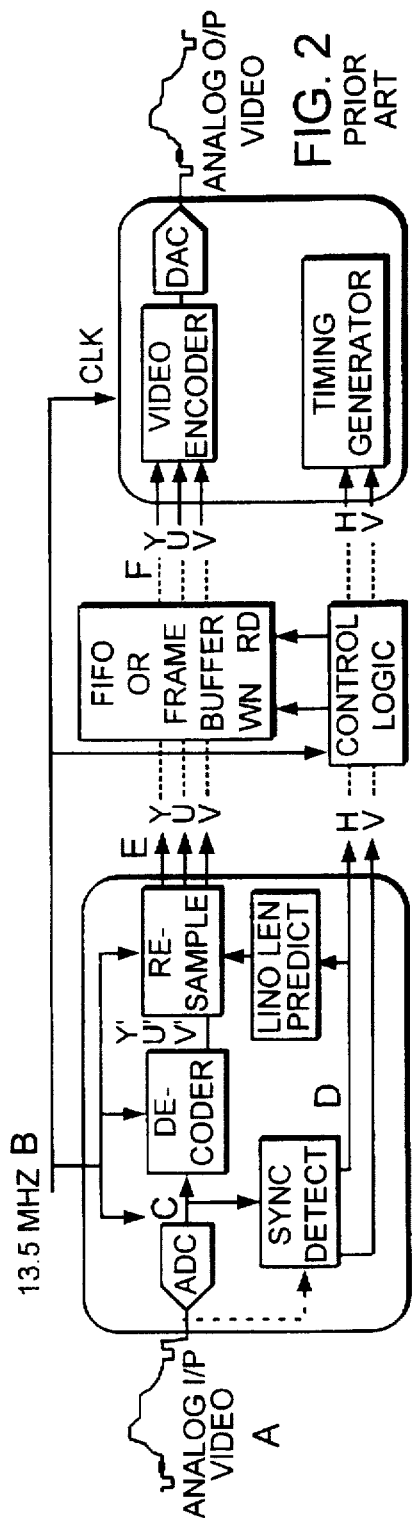
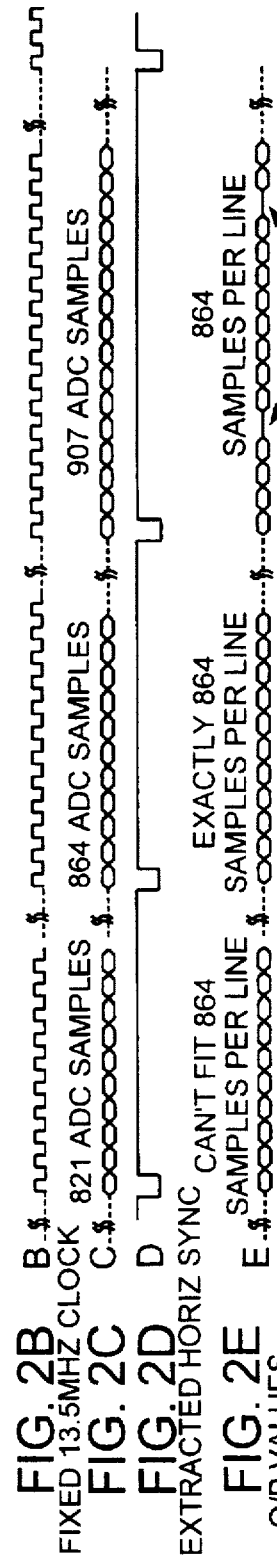

FIG. 2 PRIOR ART

FIG. 2A ANALOG I/P VIDEO A

FIG. 2B FIXED 13.5MHZ CLOCK B

FIG. 2C 821 ADC SAMPLES • 864 ADC SAMPLES • 907 ADC SAMPLES C

FIG. 2D EXTRACTED HORIZ SYNC D CAN'T FIT 864 SAMPLES PER LINE • EXACTLY 864 SAMPLES PER LINE • 864 SAMPLES PER LINE

FIG. 2E O/P VALUES DIGITALLY RESAMPLED TO 864 PER LINE BY INTERPOLATION AND/OR DECIMATION

IN PRACTICE THE USER USUALLY ONLY NEEDS 720 SAMPLES (THE ACTIVE VIDEO PORTION). THESE 720 CAN BE EXTRACTED, BUT NEED A FIFO OR FRAME BUFFER AND COMPLICATED CONTROL LOGIC TO DO SO.

NO O/P SAMPLE DURING SOME CLOCK CYCLES. (INTERPOLATOR/DECIMATION HAS TO DROP SAMPLES OCCASIONALLY TO GIVE THE CORRECT NUMBER OF OUTPUT SAMPLES) THEREFORE THE USER NEEDS A FIFO OR FRAME BUFFER AND COMPLICATED CONTROL LOGIC IN ORDER TO RE-ARRANGE THE SAMPLES CONTIGUOUSLY IN REAL-TIME AT F.

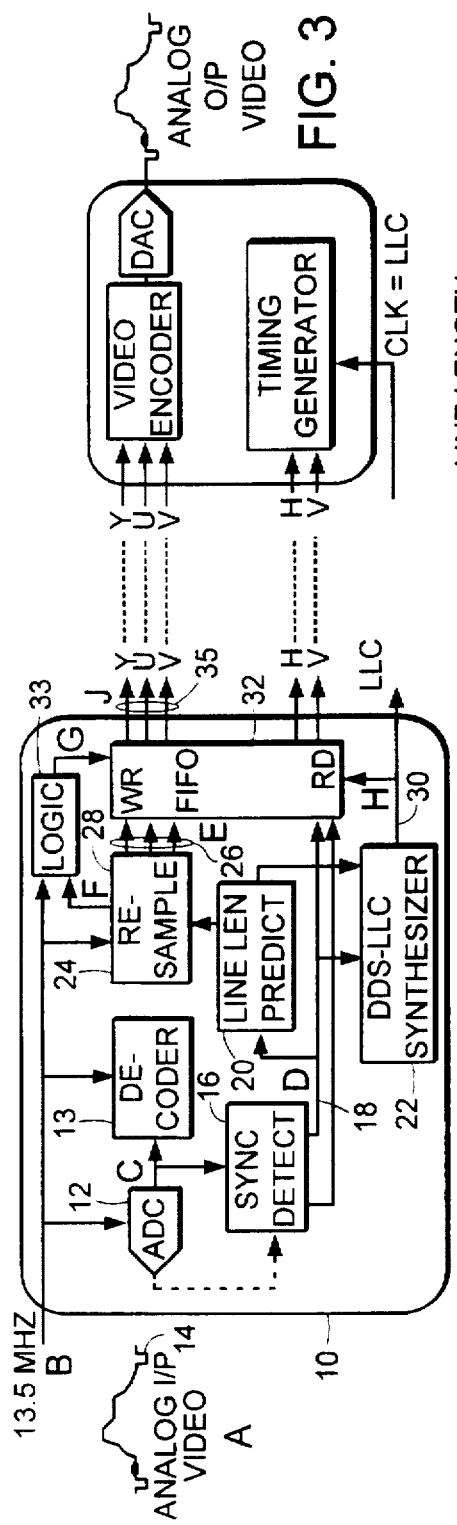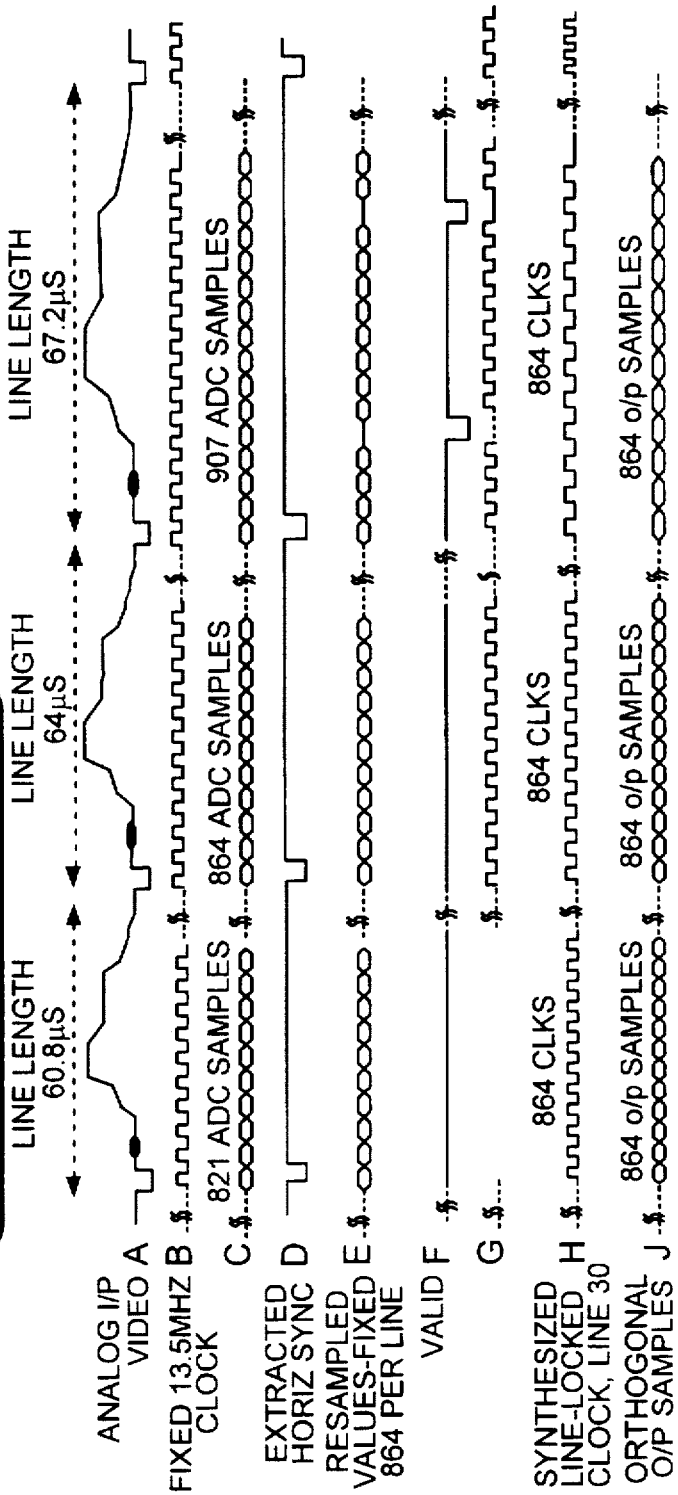
FIG. 3
FIG. 3A
FIG. 3B
FIG. 3C
FIG. 3D
FIG. 3E
FIG. 3F
FIG. 3G
FIG. 3H
FIG. 3I

VIDEO DECODER ADAPTED TO COMPENSATE FOR TIME VARIATIONS BETWEEN SUCCESSIVE HORIZONTAL/ VERTICAL SYNCHRONIZATION PULSES

BACKGROUND OF THE INVENTION

This invention relates generally to video decoders and more particularly to video decoders adapted to compensate for time variations between successive horizontal/vertical synchronization (i.e., sync) pulses.

As is known in the art, video signals have a nominal line length of 63.55 µs for NTSC systems or 64 µs for PAL systems. Each line is initialized with either a horizontal or vertical sync pulse. In systems which digitally process these video signals, a digital decoder,with an analog to digital converter, is used to sample the video signal at a sampling rate of typically 13.5 MHz (or some other frequency greater than the Nyquist limit, for example 27 MHz) thereby ideally producing 858 samples per line for the NTSC system or 864 samples per line for the PAL system. These samples should be orthogonal, that is, the first sample should be coincident with the falling edge of the horizontal sync (H-sync) for each line. Thus, the samples on successive lines should form a square grid.

However, there are two problems with using a fixed sampling clock. The first is that the sync pulse of the video signal is asynchronous to the fixed sampling clock, therefore there will be a phase error in the sample time of the analog to digital converter. The phase error will be different for each line, i.e., non-orthogonal sampling. The second problem is that there may be variations in the line length of the video signal between successive sync pulses. More particularly, while sync pulses are produced accurately in a studio environment, when produced by a home video recorder, for example, fluctuations in tape drive motor speed produce variations in the time duration of each line, resulting in variations in the number of samples which will be produced for each line.

Two approaches have been used in the prior art to solve this problem. The first is a system shown in FIG. 1. Here, the video input signal, "Analog I/P Video", (A), (FIG. 1A) is fed to an analog to digital converter (ADC). A sync pulse detector is connected to either, or both, here shown to both, the analog video signal (A) and/or the output of the analog to digital converter. The sync pulse detector extracts the sync pulse (B), (FIG. 1B) i.e., decodes, the horizontal (H) and vertical (V) sync pulses included in the video signal (A). The output (B) of the sync pulse detector (FIG. 1B) is fed to a phase lock loop (PLL). The phase lock loop is locked, i.e. synchronized to, the sync pulses (B), FIG. 1B. The PLL produces clock or sampling pulses (C) (FIG. 1C) for the analog to digital converter (ADC). More particularly, the PLL produces nominally 858 clock, or sampling pulses (C) for the analog to digital converter for the NTSC system, or 864 clock, or sampling pulses for the PAL system, synchronized with, i.e., "locked-to", each horizontal sync pulse (H), as shown FIG. 1C for the PAL system. It is noted from FIG. 1C that the phase lock loop produces these 858, or 864, clock or sampling pulses (C) in response to each horizontal sync (H) pulse (B) independent of the time duration of the line length. That is, referring to FIG. 1C, the phase lock loop produces 858 pulses for the NTSC system, or 864 pulses for the PAL system, if the line is at the nominal 64 µs time duration (shown in the center of FIG. 1A), a shorter time duration, such as a time duration of 60.8 µs (shown in the left in FIG. 1A), or a longer time duration such as 67.2 µs (shown in the right of FIG. 1A). Thus, for each sync pulse, 858 digital samples (D) are produced for each line of the NTSC system and 864 digital samples (D) (FIG. 1D) are produced for each line of the PAL system, as shown in FIG. 1D. This signal (C) is typically called a "line-locked" clock, LLC, since it is clock pulses locked to the sync pulse of each video signal line.

The digitized samples (D) are decoded by the decoder into Y, U, and V signals (E) for each video line as shown in FIG. 1E. For illustration, the decoded signals (E) are shown being fed to a video encoder for re-creation as shown in FIG. 1F.

It is first noted that the system shown in FIG. 1 provides 864, or 858 samples per line, as the case may be, even where there are variations in line length of 5% from nominal, as shown in FIG. 1A; however, the line length clock, LLC, signal (C) frequency, FIG. 1C, also varies from nominal by 5%, in order to maintain the 864, or 858 samples per line, as the case may be. Thus, while such system may be adequate in some applications, the variable clock and analog to digital converter data conversion rate may cause significant problems when interfacing with other arrangements. The system also includes complicated analog circuitry which is difficult to integrate with digital integrated circuitry. Further, there is a limitation to the tracking ability of the analog phase lock loop and the clock pulses it produces contain a significant amount of clock jitter. The analog to digital circuit operating from clock pulses generated by the phase lock loop will therefore have jitter adversely effecting the resolution and signal to noise ratio of the analog to digital converter. Additionally, the accuracy of the analog to digital converter may not be optimized because such circuit may have been optimized for operation with a known, fixed clock sampling rate.

A second approach which has been used is with a system shown in FIG. 2. The input video signal is shown in FIG. 2A: The center of such FIG. 2A showing a nominal line of 64 µs length for the PAL system; the left of such FIG. 2A showing a line length shorter than nominal, here 60.8 µs for the PAL system; and, the right of such FIG. 2A showing a line length longer than nominal, here 67.2 µs for the PAL system. Here, the analog to digital converter (ADC) operates at a fixed clock frequency, here 13.5 MHz, as shown in FIG. 2B. The output (C) of the analog to digital converter (ADC) is shown in FIG. 2C and is decoded into Y', U', V' signals. It is noted that the signals Y', U', V' are the normal Y, U, and V signals, however, the number of samples of such signal are also produced at the fixed, here 13.5 MHz rate. Therefore, the number of samples the Y', U', V' signals per video line will vary with variations in line length. For example, referring to FIG. 2C, the number of digitized samples produced by the analog to digital converter, and decoder, will be, for the PAL system, 821 samples with a shorter than nominal line length of 60.8 µs, 864 samples with the nominal 64 µs line length, and 907 samples for a longer than nominal line length of 67.2 µs, as shown. The output of the decoder is then fed to a re-sampler (i.e., an interpolation/decimation filter), such as described in an article entitled, "Image resizing and enhanced digital video compression" by Calvin Ngo, published in EDN, Jan. 4, 1996 pages 145 through 155, which produces, for each video line 864 samples, Y, U, V for the PAL system, or 858 samples, Y, U, V, for the NTSC system.

As in FIG. 1, a sync pulse detector extracts the horizontal (H) and vertical (V) sync pulses (D), as shown in FIG. 2D from the input video signals (A), FIG. 2A. The extracted horizontal (H) sync pulse is fed to a line length predictor. The line length predictor determines the time duration (i.e., length) of the video input signal line. The determined line length information is fed to the re-sampler along with the digitized samples, Y', U', V, at the output thereof (E), as shown in FIG. 2E. For each video input signal (A) line, the re-sampler produces 858 samplers for the NTSC system or 864 samples for the PAL system, as shown in FIG. 2E for the PAL system.

It should be noted that the output samples (E) are not contiguous in real time. For example, it should be noted that where the line length is longer than the nominal line length (i.e., in the right of FIG. 2E), there will be no valid output samples (F), on some clock cycles because the interpolation/decimation in the re-sampler has to drop samples occasionally, as described in the above referenced article by Ngo, in order to produce the correct number of output samples. Therefore, a FIFO or frame buffer is required and relatively complicated control logic is needed in order to properly re-arrange the samples contiguously in real time.

It should be noted that where the line length is shorter than nominal (i.e., the left in FIG. 2E), while the re-sampler (i.e., interpolation/decimation filter) can theoretically interpolate from 821 samples to 864 samples (i.e. the correct number of samples in this PAL system example), there are not enough clock cycles to output all 864 samples during the line length time since it is shorter than (i.e., 60.8 μs) the nominal time of 64 μs. In practice users typically need only 720 samples (i.e., those samples corresponding to the active video portion of the video line), however, the FIFO or frame buffer and control logic is required to identify and extract these 720 needed samples. Alternatively, if the video decoder were operated at a higher clock, or sampling frequency, i.e. at an oversampling rate of 27 MHz, for example, then for the shorter-than-nominal line length of 60.8 μs in FIG. 2E, the ADC would generate 1642 samples instead of the 821 samples shown. The re-sampler (i.e., interpolation/decimation filter) would then decimate from 1642 samples to the 864 samples, resulting once again in the situation described in the previous paragraph where samples are occasionally dropped.

To put it another way, with the system shown in FIG. 2, the output samples (E) are not contiguous in real time when the input video signal (A) has timing variations, as shown in FIG. 2A. Therefore, in order to display the output samples (E) through a video encoder, the system requires a FIFO or frame buffer and additional logic. Even then, overflow, or underflow may occur. For example, if the line length is 63.4 μs; however, 856 samples are read from the analog to digital converter and decoder and re-sampled by the re-sampler to 858 samples with the NTSC system, thereby creating an overflow situation.

SUMMARY OF THE INVENTION

In accordance with the present invention, a video decoder is provided wherein digitized samples of an input video signal are produced at a fixed sampling rate and, from such digitized samples, a fixed number of re-sampled digitized samples are produced for each detected sync pulse included in the video signal. The re-sampled digitized samples are stored in a buffer memory and are retrieved from such buffer memory at a rate synchronized to the sync pulse.

With such an arrangement, the analog to digital converter operates at a fixed sampling rate, and a overflow situations are avoided.

In another embodiment, the decoder is adapted to operate in different modes; in one of such modes the samples stored in the buffer memory are retrieved therefrom at a rate synchronized to the sync pulses and in another one of such modes the samples are retrieved from the buffer memory at a different rate from the rate such samples are stored in such buffer memory, such different rate being either a fixed rate or a rate variable with time duration between succeeding sync pulses.

BRIEF DESCRIPTION OF THE DRAWING

Other advantages of the invention, as well as the invention itself, will become more readily apparent when read together with the following detailed description taken together with the accompanying drawings, in which:

FIG. 1 is a block diagram of a video decoder in accordance with the prior art;

FIGS. 1A through 1F are timing histories of various signals produced with the video decoder of FIG. 1 for video signals having three different line lengths, one being a nominal line length for a PAL system;

FIG. 2 is s block diagram of another video decoder in accordance with the prior art;

FIGS. 2A through 2E are timing histories of various signals produced with the video decoder of FIG. 2 for video signals having three different line lengths, one being a nominal line length for a PAL system;

FIG. 3 is a block diagram of a video decoder in accordance with the invention;

FIGS. 3A through 3I are timing histories of various signals produced with the video decoder of FIG. 3 for video signals having three different line lengths, one being a nominal line length for a PAL system;

DESCRIPTION OF THE PREFERRED EMBODIMENTS

Figure 4:
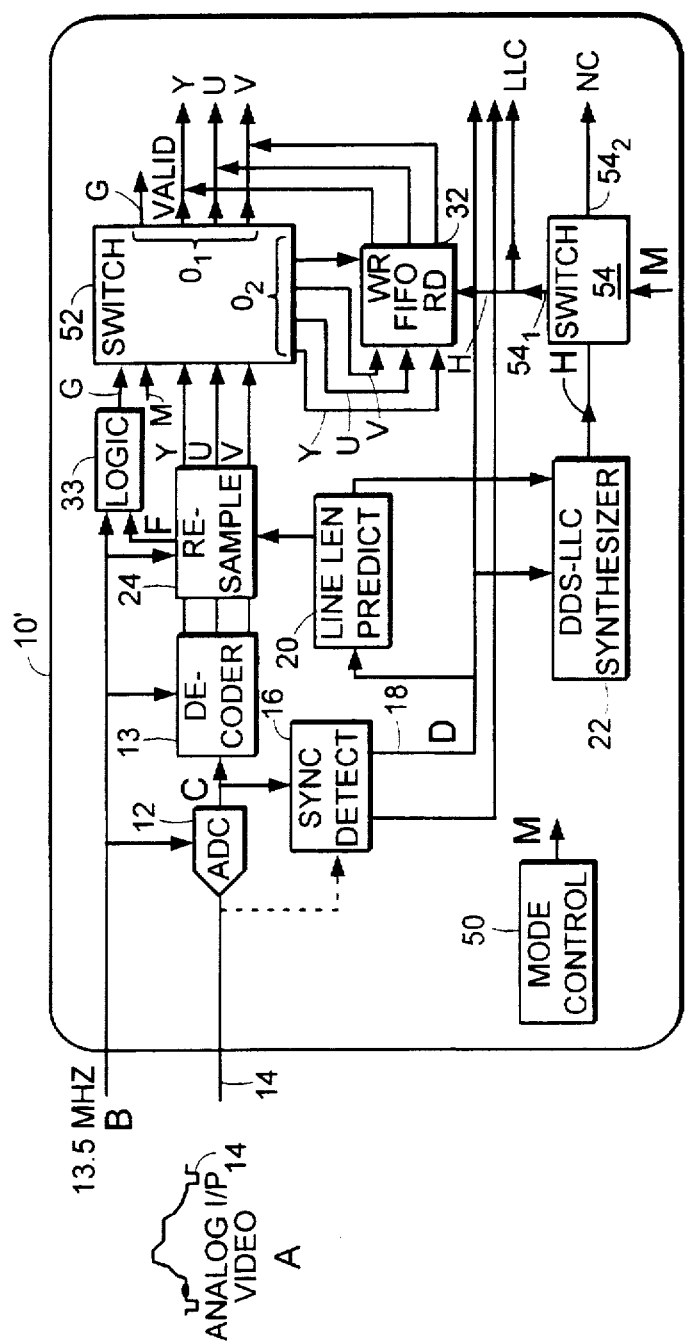
FIG. 4 is a block diagram of a video decoder in accordance with an alternative embodiment of the invention.

Referring now to FIG. 3, a video decoder 10 is shown to include an analog to digital converter (ADC) 12 fed by a video input signal (A), FIG. 3A, on line 14. The video input signal (A) may be either an NTSC or PAL video signal wherein each line of video information is proceeded by a sync pulse. Ideally, each video signal line has a time duration of 63.55 μs for the NTSC system or 64 μs for the PAL system. Thus, referring to the center in FIG. 3A, for the PAL system the nominal line length of 64 μs is shown. A shorter than nominal line length, here 60.8 μs is shown in the left of FIG. 3A and a longer than nominal line length, here 67.2 μs is shown in the right of FIG. 3A.

The ADC 12 is fed with clock, or sampling signals (B), shown in FIG. 3B, at a fixed rate, here a rate of 13.5 MHz, as indicated, it being understood that conventional oversampling techniques may be used and sampling of 27 MHZ may therefore be used. The digitized samples (C) produced by the ADC 12 are shown in FIG. 3C. The input video signal (A) on line 14, or alternatively, the digitized samples (C) produced at the output of ADC 12, are fed to a sync pulse detector 16, as shown. The sync pulse detector 16 extracts horizontal (H) and vertical sync (V) pulses from the video input signal. The sync detector 16 produces a pulse (D), shown in FIG. 3D, on line 18 in response to each detected horizontal (H) sync pulse. The pulse (D) on line 18 is fed to a line length predictor 20 and a direct digital synthesizer 22, as indicated.

The line length predictor 20 estimates (i.e. predicts) the time duration of the incoming video signal line, $L_p$, based on the history of preceding video signal line lengths. Thus, nominally, the line length would be, as noted above, 63.55 µs for the NTSC system or 64 µs for the PAL system, as shown in the center of FIG. 3A for the PAL system. However, where the source of the video signal on line 14 is from a video recorder, tape motor speed variations produce corresponding variations in the video signal line length, as shown in the left and right of FIG. 3A. Thus, the time duration between successive sync pulses may deviate from the nominal or standard line lengths of 63.55 µs for the NTSC system or 64 µs for the PAL system. The line length estimation, or prediction, $L_p$, produced by the line length predictor 20 is fed to a re-sampler 24, as shown, and to the direct digital synthesizer/line-locked clock (LLC) synthesizer 22, as shown. Also fed to the re-sampler 24 are the digitized samples (C) produced by the ADC 12 in response to the fixed sampling rate, here 13.5 MHz, sampling signals fed thereto, as shown, after such digitized samples have been decoded by decoder 13, at the fixed rate, here 13.5 MHz, into Y', U' and V;, signals. The re-sampler 24 produces a fixed number, N, of digitized samples (E), FIG. 3E, at the output thereof (i.e., on lines 26) for each video line. For the NTSC system, N=858 digitized samples and for the PAL system N=864 samples. These digitized samples produced by the re-sampler are produced in response to the fixed clock signals also fed to the ADC 12, i.e., the 13.5 MHz sampling rate. The re-sampler 24 is a multi-tap digital filter which is adapted to provide interpolation/decimation between the digital samples produced by the ADC 12,as described in the above referenced article by Ngo. For example, if the estimate time duration, $L_p$, between successive sync pulses is the nominal time duration (i.e., 63.5 µs for the NTSC system or 64 µs for the PAL system) there would not be either an interpolation or decimation between the samples produced by the ADC 12; rather, each sample produced by the ADC 12 would appear at the output of the re-sampler 24 (i.e. on line 26), as shown in the center of FIG. 3E for the PAL system. If, however, the line length, $L_p$, predicted, or estimated, by the line length predictor 20 were 60.8 µs for the PAL system as shown in the left in FIG. 3E instead of the nominal 64 µs time duration, the ADC 12 and decoder 13 would have produced only 821 samples; i.e., 43 samples less than required for a full 64 µs line length. Thus, in such example, the re-sampler 24 process the 821 samples fed thereto by the ADC 12 and decoder 13 and, through interpolation, produces 864 samples, such 864 samples being produced on the lines 26 at the fixed 13.5 MHz clock rate of the ADC 12. If, however, the line length predicted, $L_p$, by the line length predictor 20 is greater than the nominal line length, for example, if $L_p$ is 67.2 µs for a PAL system, as shown in the right in FIG. 3E, the ADC 13 and decoder 13 will produce 907 samples during the 67.2 µs line length. Because the re-sampler 24 produces only 864 samples at the fixed 13.5 MHz rate during each video line time duration, here only 864 samples for the 67.2 µs line length, there will be 43 time slots with invalid data. The re-sampler 24 produces a signal (F) on line 28, shown in FIG. 3F. The signal (F) on line 28 is a "valid" signal (i.e., here logic 1 signal) which changes to an "invalid" (i.e., logic 0 signal) whenever the output sample produced by the re-sampler 24 is invalid, i.e., whenever the re-sampler 24 decimation filter drops a sample. This valid/invalid signal (F) on line 28 is here the "overflow" or "underflow" bit in a moving average decimation filter as described in FIG. 7, below.

The direct digital synthesizer/line-locked clock (LLC) synthesizer 22 produces on line 30 a synthesized line-locked clock LLC (H) shown in FIG. 3H in response to each detected horizontal (H) sync pulse (D) shown in FIG. 3D. The frequency of the synthesized LLC on line 30 is equal to the nominal number of samples, N, divided by the predicted line length, $L_p$, estimated by the line length predictor 20. Thus, referring the center of FIG. 3H, the LLC pulses produced by the DDS/LLC synthesizer 22 on line 30 when the line length predicted by the line length predictor 20, $L_p$ is 64 µs for the PAL system have a frequency of (864/64) MHz. Referring to the left of FIG. 3H, if the line length, $L_p$, predicted by the line length predictor 20 is 60.8 µs in the PAL system, the frequency of the LLC produced by the DDS/LLC synthesizer 22 would be (864/60.8) MHz. Referring to the right of FIG. 3H, if the line length, $L_p$, predicted by the line length predictor 20 is 67.2 µs in the PAL system, the frequency of the LLC produced by the DDS/LLC synthesizer 22 would be (864/67.2) MHz.

Thus, in response to each detected sync pulse (FIG. 2D) the DDS/LLC synthesizer 22 produces the fixed number, N, of clock pulses on line 30 for each input video signal on line 14 independent of its time duration. For the NTSC system, N=858 and for the PAL system, N=864. In either case, the N clock pulses (i.e., synthesized line-locked clock LLC pulses) on line 30 are synchronized to each detected horizontal (H) sync pulse (D) shown in FIG. 3D.

The video decoder 10 includes a buffer memory 32, here a first-in/first-out (FIFO). Fed to the input of the buffer memory 32 are the Y, U, and V, digitized samples (E) FIG. 3E) produced by the re-sampler 24 on line 26. The digitized samples produced on line 26 are written into (i.e., stored in) the buffer memory in response to write pulses produced by AND gating in logic 33 the fixed 13.5 MHz clock, or sampling, pulses fed to the ADC 12 and re-sampler 24, as indicated, and the logic 1 valid data level (F), shown in FIG. 3F, produced by the re-sampler 24. As discussed above, a non-valid data level (i.e. logic 0) signal is produced only where the video signal line is greater than the nominal length. Thus, referring again to the right in FIG. 3F, non-valid signals are produced by the re-sampler 24 because 907 samples are produced by the ADC 12 and decoder 13 during the 67.2 µs line length. These 43 non-valid signals are produced to prevent (907–864=43) samples from being stored in the FIFO buffer memory 32.

The output pulses (G) produced by AND logic gate 33 are shown in FIG. 3G. Such output pulses (G) are fed to the write enable (WR) of the FIFO buffer memory 32. Thus, the N re-sample samples (E) are stored (i.e., written into) the FIFO buffer memory 32 in response to the pulses (G), FIG. 3G, produced by the AND gate 33. The digitized samples stored in the buffer memory 32 are, however, read from the buffer memory 32 in response to the N clock pulses (H) shown in FIG. 3H, produced on line 30 by the DDS/LLC synthesizer 22; such N pulses being, as noted above, synchronized to each detected sync pulse (FIG. 3D). Thus, the N digitized samples (E), FIG. 3E, produced by the re-sampler 24 for each detected sync pulse will be produced at the output 34 of the buffer memory 32 as a sequence of N samples (I) on lines 35, FIG. 3I, in regular intervals along the line length. That is, the N output pulses produced by the DDS/LLC synthesizer 22 on line 30 provides a line-locked clock (LLC) for the buffer memory 32 read out (RD). Thus, for the NTSC system, 858 digitized samples are read from the buffer memory and appear at output are regularly spaced along a line length independent of the time duration of the but synchronized to the detected sync pulse. Likewise, for the PAL system, 864 digitized samples are read from the buffer memory and appear at output are regularly spaced along a line length independent of the time duration of the but synchronized to the detected sync pulse.

Thus, it is noted, that overflow with the system shown in FIG. 2 is avoided by using a read out clock for the buffer memory 32 which is synchronized to the detected sync pulses. That is, the synthesized LLC pulses are produced on line 30 for the buffer memory 32 after the samples produced by ADC 12 and decoder 13 have been re-sampled by the re-sampler 24. With such an arrangement, the ADC 12 operates with a fixed sampling rate, here 13.5 MHz, even where the input video signal has timing variations, and the decoder 10 and re-sampler also operate at the fixed sampling rate, here 13.5 MHZ, thereby enabling a robust system with precise definition of filter responses.

It is noted that the DDS/LLC synthesizer 22 and FIFO buffer memory 32 allow the timing of the line-locked clock (LLC) on line 30 and output samples produced by the FIFO buffer memory 32 (FIG. 3I) to vary in synchronism with the input video signal (i.e., decoupling output sample variable timing from the internal fixed clock, i.e., the fixed, here, 13.5 MHz clock signals fed the ADC 12, decoder 13 and re-sampler 24). Thus, the system 10 shown in FIG. 3, can replicate the decoder/encoder example described above in connection with FIG. 1 but with significantly better accuracy, resolution and signal-to-noise ratio.

Figure 7:
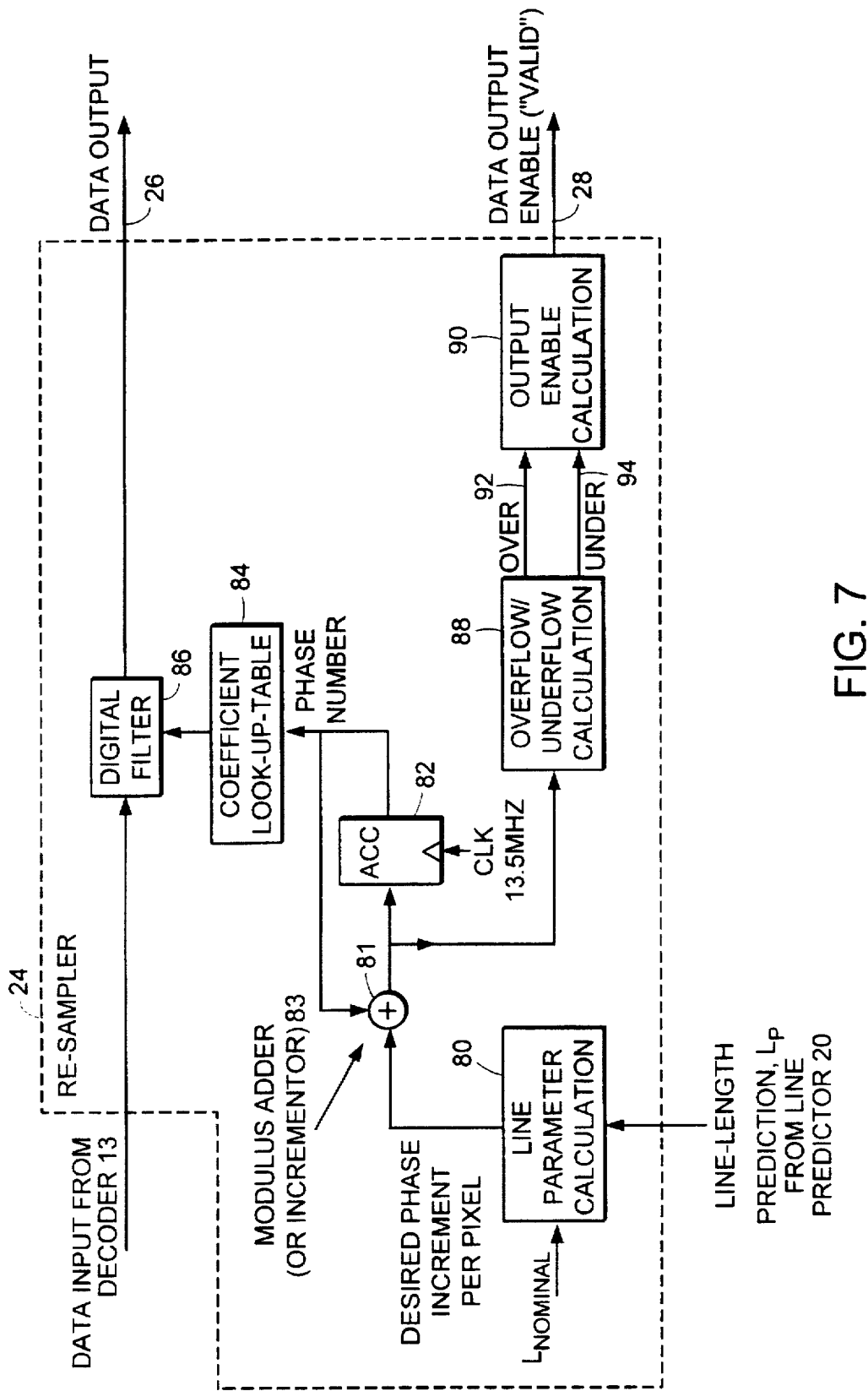
FIG. 7 is a block diagram of a re-sampler used in the decoder of FIG. 3.

Referring now to FIG. 7, re-sampler 24 is shown. The predicted line length, $L_p$, from line length predictor 20 is fed to a line parameter calculator 80. Also fed to the calculator 80 is the nominal line length, $L_{NOMINAL}$; i.e., 864 samples per line for a PAL system. The output of the line parameter calculator 80 is fed to an adder 81. The output of the adder 81 is fed to an accumulator 82. The accumulator 82 is also fed to the adder 81. The accumulator 82 is fed by the 13.5 MHz clock pulses. Thus, a modulus adder, or incrementor, 83 is provided. The output of the accumulator 82 is fed to a coefficient look-up table 84, the output of which provides weighing coefficients for digital filter 86, such digital filter 86 being fed samples from decoder 13, as described in FIG. 3. The output of the adder 81 is also fed to an overflow/underflow calculator 88 to produce an indication of an underflow situation on line 94 or an overflow situation on line 92. The signals on lines 92, 94 are fed to an output enable calculator 90 which produces the valid/invalid signal on line 28.

Further, the system 10 shown in FIG. 3 can replicate the system shown in FIG. 2 if desired by the user. In this case, the DDS/LLC synthesizer 22 is switched off and the FIFO buffer memory 32 is by-passed. If operating in this "by-pass" mode, the user interface is made simpler because of the availability of the FIFO buffer memory 32 and valid/invalid signal (F), shown in FIG. 3F. More particularly, referring now to FIG. 4, a decoder 10' is shown with like elements to the decoder 10 of FIG. 3 having the same numerical designation. The decoder 10' includes a pair of switches 52, 54. The Y, U, V outputs of the re-sampler 24 and the valid signal (G) produced by logic 33 are fed to a set of inputs of switch 52. The switch 52 has two sets of outputs, $O_1$, $O_2$. The inputs to switch 52 are coupled to one of the two sets of outputs, $O_1$, $O_2$ (i.e., either output $O_1$ or output $O_2$) selectively in accordance with a control signal, M, produced by a mode controller 50. Output set $O_2$ is fed to the FIFO buffer memory 32, as shown. The switch 54 has an input fed by the output of the DDS/LLC synthesizer 22, as shown. The switch 54 has two outputs $54_1$ and $54_2$, as shown. The input to switch 54 is coupled to either output $54_1$ or $54_2$, selectively in accordance with the control signal, M, produced by mode controller 50.

The decoder 10' is adapted to operate in one of two modes. In a first one of such mode, the mode control signal, M, operates to couple the input to switch 52 to the set of outputs $O_2$ and to couple the output of switch 54 to output $54_1$. In such first mode, the decoder operates as described above in connection with the decoder 10 (FIG. 3). In the other, (i.e., second) one of the two modes, the mode control signal, M, operates to couple the input to switch 52 to the set of outputs $O_1$ and to couple the output of switch 54 to output $54_2$. In such mode, the outputs of the re-sampler 24 and logic 33 are coupled directly out of the decoder 10', i.e., the FIFO buffer memory 32 is "by-passed", (there being no external connection (NC) to output $54_2$). Thus, in this second mode, outputs are provided by the decoder 10' without the variable output timing of FIG. 3 and the decoder 10' provides in this second mode a fully synchronous interface.

Figure 6:
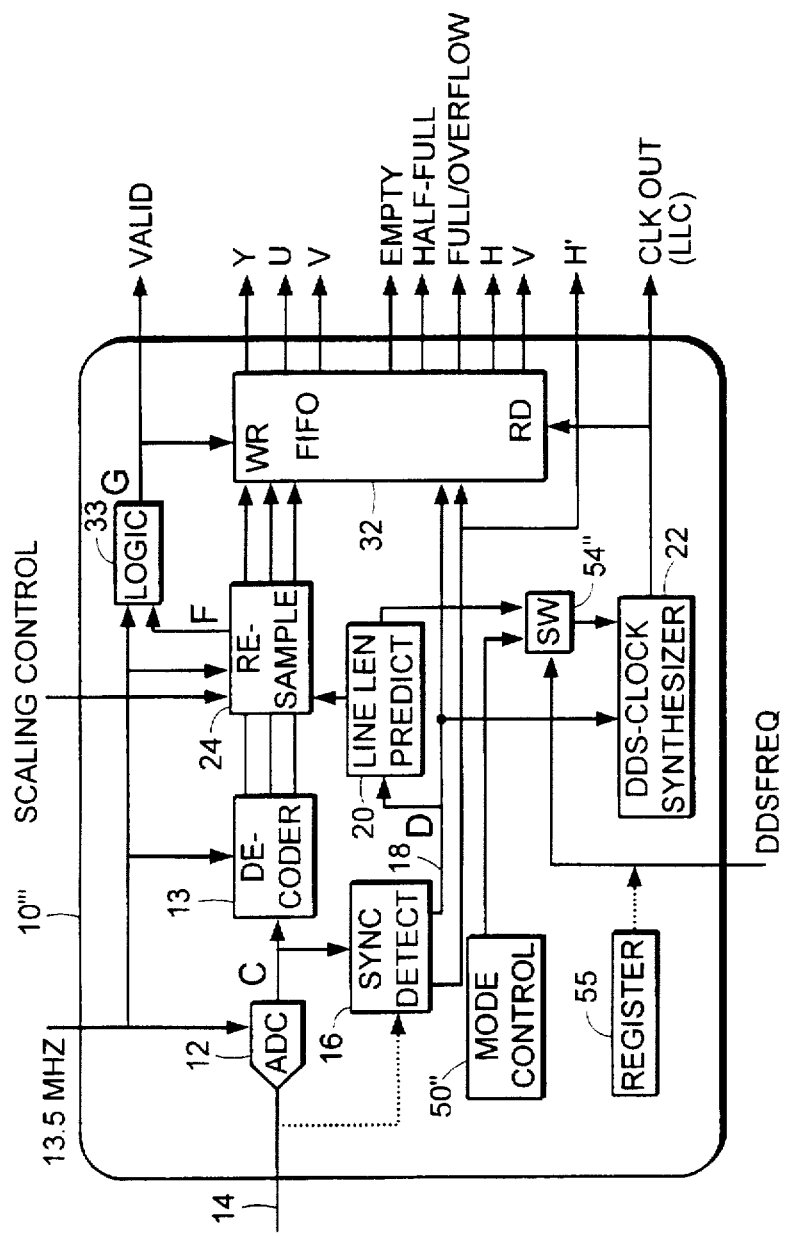
FIG. 6 is a block diagram of a video decoder in accordance with still another alternative embodiment of the invention.

In another mode of operation, the desired-frequency number input to the DDS/LLC synthesizer 22 for synthesis thereby as pulses on line 30 can be switched by the user from the LLC predictor 20. More particularly, referring to FIG. 6, a decoder 10''' is shown with like elements to the decoder 10 of FIG. 3 having the same numerical designation. Decoder 10''' includes a mode controller 50'' and a switch 54''. Here, the predicted line length, $L_p$, produced by the line length predictor 20 is fed to the DDS/LLC synthesizer 22 in one of two modes selected by the mode controller 50''. More particularly, switch 54'' has two inputs; one input is from the line length predictor 20 and the other is from an independent source, such as from either a source, DDS Freq. external to the decoder 10''', or from a programmable register 55 included in the decoder 10'''. Thus, in a first mode, the DDS/LLC synthesizer 22 produces LLC CLKOut pulses as described above in connection with FIG. 3 and in a second mode the DDS/LLC synthesizer produces clock pulses having a frequency from the independent source. In either mode, the DDS/LLC synthesizer is initiated by the sync pulse detector 16,m as described in connection with FIG. 3. Further, it is noted that an un-delayed horizontal sync pulse (H') is also available as an output from the decoder 10'''. It is still further noted that an interpolation/decimation control of the re-sampler 24 is provided.

Thus with decoder 10''', modes such as picture-scaling and output without any additional control logic or frame buffers is provided. For example, if a small video display window is desired in one corner of a computer screen, because window size is typically set by dragging a corner of the window with a mouse, the window size can end up with an arbitrary value, for example 173×119. In this case, the user can set the scaling control to 0.24 so that the re-sampler 24 would filter and decimate the 720 active video samples (sampled at 13.5 MHz (13.5×0.24), and the FIFO buffer memory 32 can then be read out at this exact rate to exactly clock out the 173 horizontal pixels to be sent to the computer display screen and it's control logic (not shown).

Figure 5:
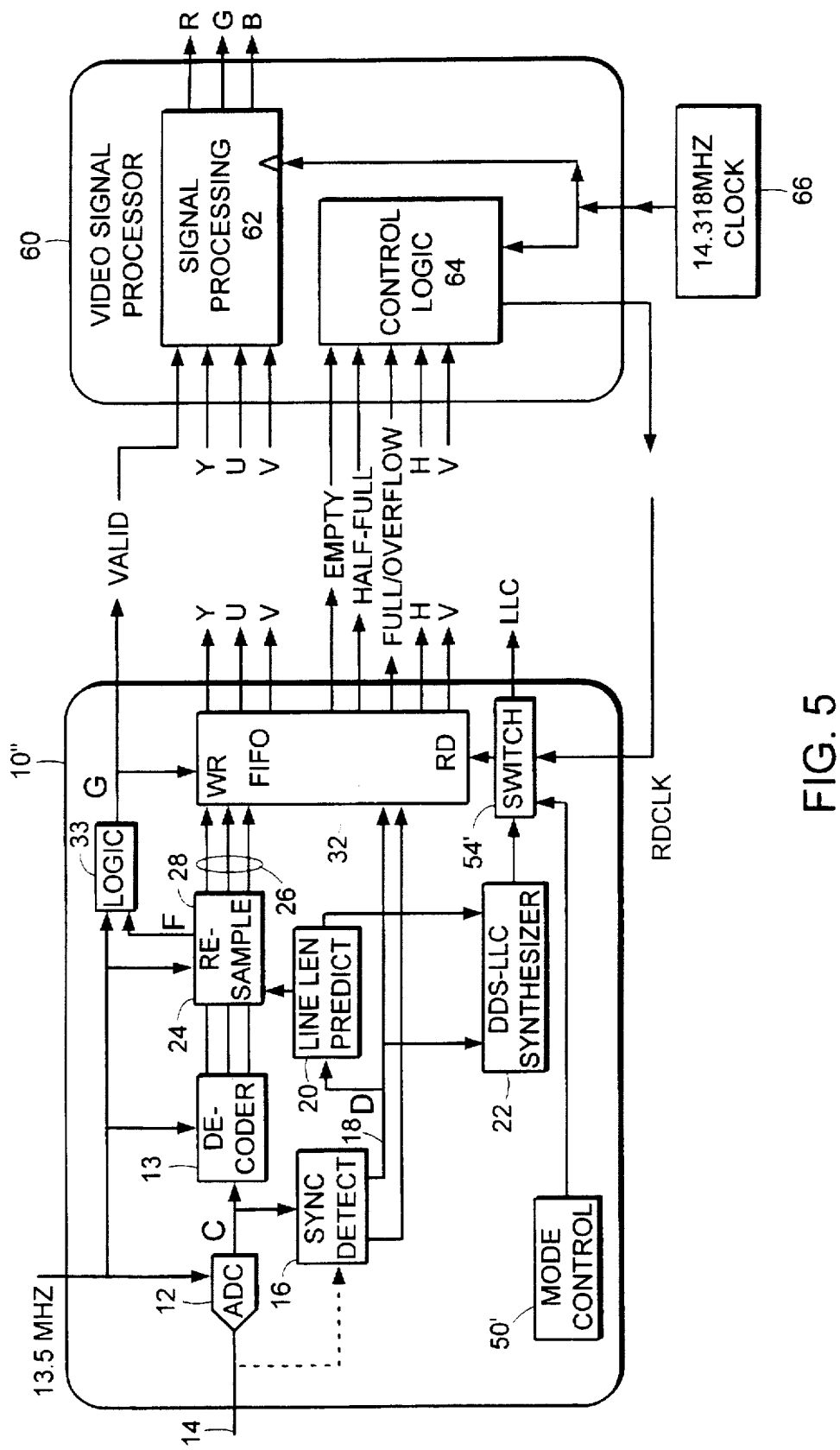
FIG. 5 is a block diagram of a video decoder in accordance with another alternative embodiment of the invention.

Referring now to FIG. 5 a decoder 10' is shown with like elements to the decoder 10 of FIG. 3 having the same numerical designation. Decoder 10'' includes a mode controller 50' and a switch 54'. The decoder 10'' is coupled to a video signal processor 60 includes a signal processor 62, for converting the Y, U, and V signals fed thereto by the decoder 10'' into red (R), green (G) and blue (B) signal, and control logic 64 which is fed: "Empty"; "Half-Empty", and "Full/Overflow" signal produced by FIFO buffer memory 32 as well as the horizontal (H) and vertical (V) sync pulses produced by the such detector 16. The video signal processor 60 is fed clock signals from a clock 66, here at a fixed rate of 14.318 MHz, a commonly used rate since it is four times the NTSC color standard frequency of 3.5795 MHz. The control logic 64 produces clock pulses RDCLK and such clock pulses are fed to one input of switch 54'. A second input to switch 54' is the output of the DDS/LLC synthesizer 22. One of the two inputs to the switch 54' is coupled to the read input of the FIFO buffer memory 32 to provide for the read out clock pulses for the FIFO buffer memory 32 selectively in accordance with the mode controller 50'.

Thus, with the decoder 10", in one mode selected by the mode controller 50', the read clock pulses are supplied by the DDS/LLC synthesizer 22 as described above in connection with FIG. 3. In anther mode selected by the mode selector 50', the DDS/LLC synthesizer 22 produced LLC clock pulses are de-coupled from the FIFO read clock pulse input (RD) and instead the FIFO buffer memory 32 read out control is made available from an external pin RDCLK, here connected to the control logic 64, as described above. As in FIG. 3, the FIFO buffer memory 32 is written with only valid data because of logic 33. The user, here the video signal processor 60, can then read out the data in stored in the FIFO buffer memory 32 using the clock pulses at the external RDCLK pin, here using the clock 66, for example. To assist this read operation, the decoder 10" provides various control signal from the FIFO buffer memory 32 (i.e., "Empty", "Half Full", "Full/Overflow"). In the example shown, the user may have a video signal processor 64 operating from the 14.318 MHz clock 66, but may need to digitize at 13.5 MHz, the CCIR601 International; Standard. This can easily be done with decoder 10" by letting the FIFO buffer memory 32 reach "Half-Full" of "Full" at the 13.5 MHz write rate and then reading the FIFO buffer memory at the faster 14.318 MHz rate. Further, the user, here the video signal processor 60 can monitor the horizontal sync signal, then program the DDS/LLC synthesizer 22 to generate a 14.31 MHz clock and read out the FIFO buffer memory 32 at the 14.31 MHz rate. Thus, the decoder is adapted to operate in different modes; in one of such modes the samples stored in the buffer memory are retrieved therefrom at a rate synchronized to the sync pulses and in another one of such modes the samples are retrieved from the buffer memory at a different rate from the rate such samples are stored in such buffer memory, such different rate being either a fixed rate or a rate variable with time duration between succeeding sync pulses.

Other embodiments are within the spirit and scope of the appended claims. For example, the user, here the video signal processor 60 in FIG. 5, can monitor the horizontal sync signal, then program the DDS/LLC synthesizer 22 via a programmable register 55 in FIG. 6 to generate a 14.31 MHz clock and read out the FIFO buffer memory 32 at the 13.5 MHz rate.

What is claimed is:

1. A system for converting an analog video signal into a corresponding digital signal, such analog video signal having time varying timing sync pulses, comprising:

a sync pulse detector for detecting the timing sync pulses;

an analog to digital converter, operating at a fixed sampling rate, for digitizing a portion of the video signal subsequent to each one of the timing sync pulses;

a line length predictor fed by the sync pulse detector for producing a signal representative of a time duration between the timing sync pulses;

a re-sampler, for producing, from the digitized portion of the video signal and the signal produced by the line length predictor, a predetermined, fixed number of digitized samples for the digitized portion of the video signal;

a read out clock pulse generator, fed by the sync pulse detector, for producing a series of read out clock pulses in response to each detected sync pulse;

a buffer memory for storing the fixed number of digitized samples produced by the re-sampler, such stored digitized samples being read from the buffer in response to the read out clock pulses.

2. A video decoder, comprising:

an analog to digital converter for producing digitized samples of an input video signal at a fixed sampling rate, such input video signal having a sequence of timing sync pulses;

a line length predictor for producing a signal representative of a time duration between the timing sync pulses;

a re-sampler, responsive to the signal produced by the line length predictor, for producing from such digitized samples, a fixed number of re-sampled digitized samples for the digitized portion of the video signal;

a buffer memory for storing the re-sampled digitized samples and for having read therefrom such re-sampled digitized samples at a rate synchronized to the sync pulse.

3. The video decoder recited in claim 2 wherein such decoder is adapted to operate in different modes; in one of such modes the samples are stored in the buffer memory are retrieved therefrom at a rate synchronized to the sync pulses and in another one of such modes the samples are retrieved from the buffer memory at a different rate from the rate such samples are stored in such buffer memory, such different rate being either a fixed rate or a rate variable with time duration between succeeding sync pulses.

4. The decoder recited in claim 1 wherein the line length predictor is responsive to a history of video signal time durations between successive timing sync pulses and, based on such history, produces the control signal.

5. A system for converting an analog video signal into a corresponding digital signal, such analog video signal having time varying timing sync pulses, comprising:

an analog to digital converter for producing digitized samples of an input video signal at a fixed sampling rate, such input video signal having a sequence of timing sync pulses;

a sync pulse detector fed by the analog to digital converter for detecting the timing sync pulses;

a line length predictor fed by the sync pulse detector for producing a signal representative of a time duration between the timing sync pulses;

a re-sampler, fed by the analog to digital converter and by the signal produced by the line length predictor, for producing from the digitized samples produced by the analog to digital converter, a fixed number of re-sampled digitized samples from the digitized portion of the video signal;

a buffer memory for storing the re-sampled digitized samples and for having read therefrom such re-sampled digitized samples at a rate synchronized to the sync pulse.

6. The decoder recited in claim 5 wherein the line length predictor is responsive to a history of video signal time durations between successive timing sync pulses and, based on such history, produces the control signal.

7. A system for converting an analog video signal into a corresponding digital signal, such analog video signal having time varying timing sync pulses, comprising:

- an analog to digital converter for producing digitized samples of an input video signal at a fixed sampling rate, such input video signal having a sequence of timing sync pulses;
- a sync pulse detector fed by the analog to digital converter for detecting the timing sync pulses;
- a line length predictor fed by the sync pulse detector for producing a signal representative of a time duration between the timing sync pulses;
- a re-sampler, fed by the analog to digital converter and by the signal produced by the line length predictor, for producing from the digitized samples produced by the analog to digital converter, a fixed number of re-sampled digitized samples from the digitized portion of the video signal;
- a read out clock pulse generator, fed by the sync pulse detector, for producing a series of read out clock pulses in response to each detected sync pulse;
- a buffer memory for storing the fixed number of digitized samples produced by the re-sampler, such stored digitized samples being read from the buffer in response to the read out clock pulses.

8. The decoder recited in claim 7 wherein the line length predictor is responsive to a history of video signal time durations between successive timing sync pulses and, based on such history, produces the control signal.

* * * * *